(12) United States Patent
Sigal et al.

(10) Patent No.: US 9,969,216 B2
(45) Date of Patent: May 15, 2018

(54) INTELLIGENT CASTER SYSTEM WITH OCCUPANCY DETECTION AND OPTIONAL SOLAR PANEL FOR USE WITH A FURNITURE COMPONENT

(71) Applicant: TOME, INC., Royal Oak, MI (US)

(72) Inventors: Jacob R. Sigal, Ferndale, MI (US); Massimo Baldini, Beverly Hills, MI (US); Philip J. Danne, Royal Oak, MI (US); Kent Suzuki, Oakland, CA (US); Eric Christopher Barch, Oxford, MI (US)

(73) Assignee: TOME, INC., Royal Oak, MI (US)

( * ) Notice: Subject to any disclaimer, the term of this patent is extended or adjusted under 35 U.S.C. 154(b) by 0 days. days.

(21) Appl. No.: 15/212,915

(22) Filed: Jul. 18, 2016

(65) Prior Publication Data

US 2017/0050467 A1    Feb. 23, 2017

Related U.S. Application Data

(60) Provisional application No. 62/208,350, filed on Aug. 21, 2015.

(51) Int. Cl.

| G08B 21/00 | (2006.01) |
|---|---|
| B60B 33/00 | (2006.01) |
| B60B 33/02 | (2006.01) |
| B60W 10/00 | (2006.01) |
| G08B 21/22 | (2006.01) |

(52) U.S. Cl.
CPC ...... B60B 33/0094 (2013.01); B60B 33/0092 (2013.01); B60B 33/026 (2013.01); B60W 10/00 (2013.01); G08B 21/22 (2013.01)

(58) Field of Classification Search
CPC .... B60B 33/00; B60B 33/028; B60B 33/0092
See application file for complete search history.

(56) References Cited

U.S. PATENT DOCUMENTS

| 3,913,395 | A | * | 10/1975 | Brooks | ................. | G01L 5/0028 |
|---|---|---|---|---|---|---|
| | | | | | | 73/115.04 |
| 5,090,770 | A | * | 2/1992 | Heinrichs | ................ | A47C 3/30 |
| | | | | | | 188/300 |
| 5,323,695 | A | | 6/1994 | Borgman et al. | | |
| 5,861,582 | A | * | 1/1999 | Flanagan | ................. | G01G 3/13 |
| | | | | | | 177/144 |

(Continued)

FOREIGN PATENT DOCUMENTS

GB            2266643 A   * 11/1993   ............... G01S 5/02

*Primary Examiner* — Joseph Feild
*Assistant Examiner* — Rufus Point
(74) *Attorney, Agent, or Firm* — Stephen T. Olson; Harness, Dickey & Pierce, P.L.C.

(57) ABSTRACT

The present disclosure relates to an electronic caster system for use with a furniture component. The system may have a caster with a body portion, a wheel supported for rolling movement relative to the body portion, and a neck portion. The neck portion may be adapted to be operably coupled to the furniture component to enable swiveling movement of the body portion. A processor may be provided which is supported on the caster. A sensing component may also be included which is carried on the caster for sensing a condition affecting the caster, and generating an output signal in accordance with the sensed condition to the processor.

17 Claims, 4 Drawing Sheets

(56) References Cited

U.S. PATENT DOCUMENTS

| | | | |
|---|---|---|---|
| 5,884,882 A | 3/1999 | Nada et al. | |
| 6,062,148 A | 5/2000 | Hodge et al. | |
| 6,546,880 B2 | 4/2003 | Agee | |
| 6,595,144 B1 | 7/2003 | Doyle | |
| 6,831,829 B2 | 12/2004 | Einhom et al. | |
| 7,077,068 B1 | 7/2006 | Agee | |
| 7,517,029 B2 | 4/2009 | Cvek | |
| 7,554,437 B2 | 6/2009 | Axelsen | |
| 7,729,880 B1* | 6/2010 | Mashburn | H04L 67/12 |
| | | | 702/151 |
| 7,780,578 B2 | 8/2010 | Packham | |
| 7,789,025 B2 | 9/2010 | Michaud, II et al. | |
| 8,016,351 B2* | 9/2011 | Cassaday | A47C 1/022 |
| | | | 297/217.1 |
| 8,485,945 B2 | 7/2013 | Leonhard | |
| 8,587,439 B2 | 11/2013 | Levine et al. | |
| 8,690,578 B1 | 4/2014 | Nusbaum et al. | |
| 8,743,198 B2 | 6/2014 | Padmanabh et al. | |
| 8,947,215 B2 | 2/2015 | Mandel et al. | |
| 2003/0070233 A1* | 4/2003 | Ganance | A61G 7/00 |
| | | | 5/620 |
| 2005/0236196 A1* | 10/2005 | Runkles | A61G 5/04 |
| | | | 180/65.1 |
| 2005/0242635 A1* | 11/2005 | Cassaday | A47C 1/022 |
| | | | 297/217.3 |
| 2007/0114742 A1* | 5/2007 | Gilbert | E06C 5/02 |
| | | | 280/79.11 |
| 2007/0157385 A1* | 7/2007 | Lemire | A61G 7/005 |
| | | | 5/600 |
| 2007/0210917 A1* | 9/2007 | Collins, Jr. | A61B 5/1117 |
| | | | 340/539.1 |
| 2008/0255794 A1 | 10/2008 | Levine | |
| 2009/0179760 A1* | 7/2009 | Nebolon | B62B 3/1408 |
| | | | 340/568.5 |
| 2009/0231095 A1* | 9/2009 | Gray | B60B 33/0028 |
| | | | 340/5.64 |
| 2010/0198374 A1 | 8/2010 | Carson et al. | |
| 2010/0288322 A1* | 11/2010 | Schroeder | F02C 1/05 |
| | | | 136/201 |
| 2012/0174833 A1 | 7/2012 | Early et al. | |
| 2013/0116092 A1 | 5/2013 | Martinez et al. | |
| 2013/0117936 A1* | 5/2013 | Stryker | A61G 7/05 |
| | | | 5/600 |
| 2013/0194072 A1* | 8/2013 | Kim | G08B 5/36 |
| | | | 340/6.1 |
| 2013/0204438 A1 | 8/2013 | Hjelm | |
| 2014/0096706 A1 | 4/2014 | Labrosse et al. | |
| 2014/0137773 A1 | 5/2014 | Mandel et al. | |
| 2014/0324315 A1* | 10/2014 | Brondum | B60B 33/021 |
| | | | 701/70 |
| 2015/0266342 A1* | 9/2015 | Howard | A61G 1/0243 |
| | | | 701/36 |
| 2016/0127809 A1* | 5/2016 | Sigal | H04Q 9/00 |
| | | | 340/870.07 |
| 2016/0128467 A1 | 5/2016 | Sigal et al. | |
| 2016/0288568 A1* | 10/2016 | Brondum | B60B 33/028 |
| 2016/0339742 A1* | 11/2016 | Libakken | B60B 33/0063 |
| 2017/0050467 A1* | 2/2017 | Sigal | B60B 33/0094 |

* cited by examiner

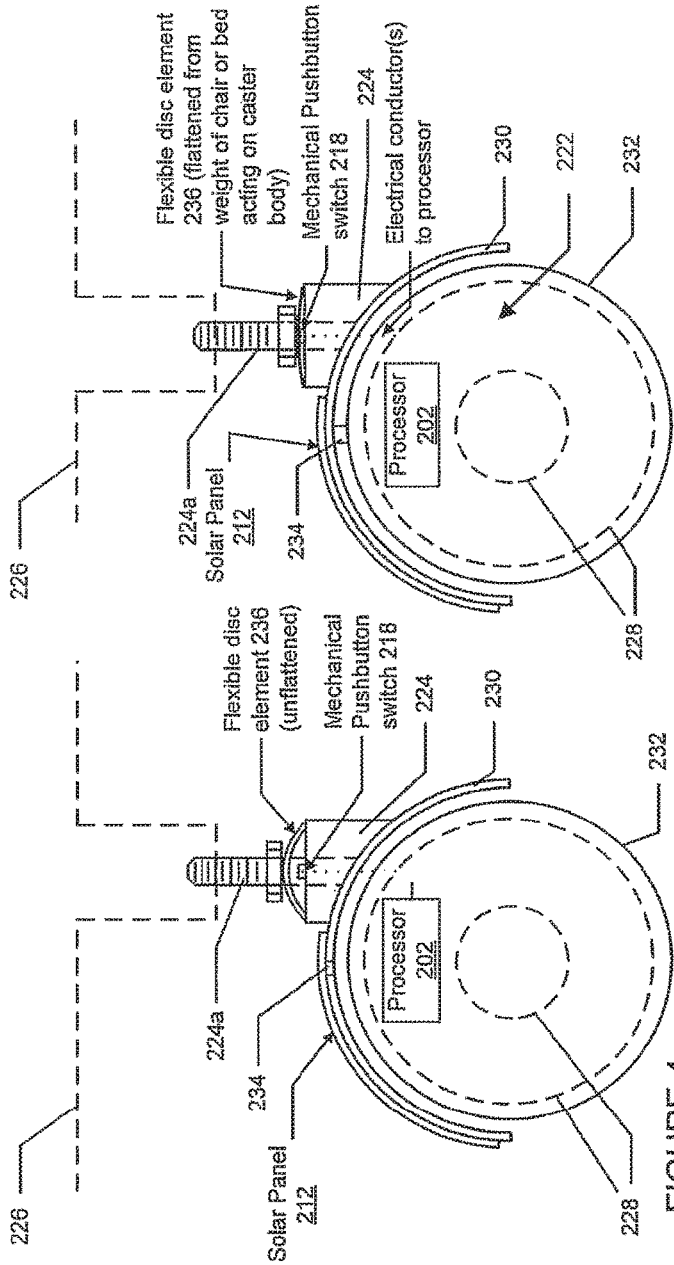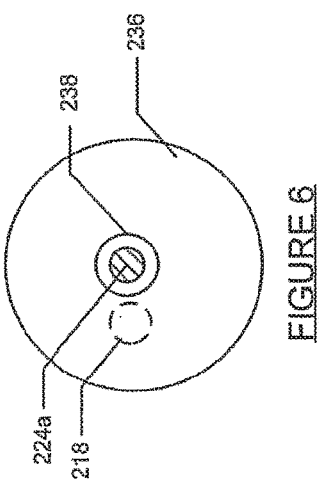

INTELLIGENT CASTER SYSTEM WITH OCCUPANCY DETECTION AND OPTIONAL SOLAR PANEL FOR USE WITH A FURNITURE COMPONENT

CROSS-REFERENCE TO RELATED APPLICATIONS

This application claims the benefit of U.S. Provisional Application No. 62/208,350, filed on Aug. 21, 2015. The entire disclosure of the above application is incorporated herein by reference.

FIELD

The present disclosure relates to casters typically used with chairs, beds and other furniture items that occasionally need to be rolled about, and more particularly to an electronic caster system which is attached to a specific furniture component such as a chair or bed, and which can sense when an individual is sitting in the chair or lying on the bed, and further which may include a solar panel for powering the electronics of the caster system, and further which can communicate wirelessly with a remote management system to report whether the chair or bed is vacant or occupied.

BACKGROUND

The statements in this section merely provide background information related to the present disclosure and may not constitute prior art.

The ability to monitor real time usage and availability of office desks, conference rooms, etc., has proven challenging. This is especially so with large office facilities. With large office facilities, there may be conference rooms or user work desks spread out over a large area.

The ability to monitor and track real time usage of such work desks and/or chairs within each conference room would provide valuable assistance to an entity in maximizing its furniture resources. Any system that could alert workers to the locations of available work desks which are vacant and available for use, in real time, would be especially useful and valuable. Being able to provide a running, real time utilization of all available desks, chairs and conference rooms in a large office setting would also be highly valuable.

Still further, since office chairs with casters are inherently more mobile than desks and other furniture items, a system which "knows" where each chair is located in a building would enable inventorying all the chairs in a given building. The ability to be able to detect if a user is present in his/her chair could also be highly valuable for enabling a receptionist at a switchboard to properly route incoming calls. For example, some form of display system which shows the receptionist whether an individual is present in her/his chair could be used by the receptionist to determine that an incoming call for a particular individual should be sent to the individual's assistant because the individual is not present in her/his desk chair. The ability to be able to monitor real time vacancy and occupancy of chairs and other furniture components such as beds would also be highly valuable in the health care field. Such a feature could alert management that an individual or patient is not present in her/his bed at a given time when the patient is expected to be present in bed or in a chair somewhere in a health care facility. In other applications, it may be highly valuable to monitor time spent by a patient in a bed for purposes of ensuring that the patient is being sufficiently ambulatory and/or to ensure the patient is re-positioned at required intervals to prevent complications from lack of circulation (e.g., bed sores). In a convalescent/nursing facility environment, these abilities would be especially valuable to health care workers and management.

SUMMARY

This section provides a general summary of the disclosure, and is not a comprehensive disclosure of its full scope or all of its features.

In one aspect the present disclosure relates to an electronic caster system for use with a furniture component. The system may comprise a caster having a body portion, a wheel supported for rolling movement relative to the body portion, and a neck portion. The neck portion may be adapted to be operably coupled to the furniture component to enable swiveling movement of the body portion. A processor may be included which is supported on the caster. A sensing component may also be included which is carried on the caster for sensing a condition affecting the caster, and generating an output signal in accordance with the sensed condition to the processor.

In another aspect the present disclosure relates to an electronic caster system for use with a furniture component. The system may comprise a caster having a body portion, a wheel supported for rolling movement relative to the body portion, and a neck portion. The neck portion is adapted to be operably coupled to the furniture component to enable swiveling movement of the body portion. A processor is provided which is supported internally within a compartment of the caster. A sensing component is also provided which is carried on the caster for sensing a condition affecting the caster, and generating an electrical output signal in accordance with the sensed condition to the processor.

In still another aspect the present disclosure relates to a method of forming an electronic caster system adapted for use with a furniture component. The method may comprise using a caster having a body portion, a wheel supported for rolling movement relative to the body portion, and a neck portion adapted to support the furniture component above a support surface. The neck portion may be coupled to the furniture component to enable swiveling movement of the body portion. The method may further comprise using a processor supported on the caster to process information. The method may still further comprise using a sensing component carried on the caster for sensing a condition affecting the caster, and generating an output signal in accordance with the sensed condition to the processor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 shows the flexible disc element and mechanical pushbutton switch of the caster system of FIG. 3 with the flexible disc element in its unflattened position;

FIG. 5 shows the caster system of FIG. 4 in the flattened position when the caster is supporting the weight of an individual; and FIG. 6 shows a plan view of just the flexible disc element, the mechanical pushbutton switch and the stem of the caster to illustrate an alignment of these components.

DETAILED DESCRIPTION

Figure 1:
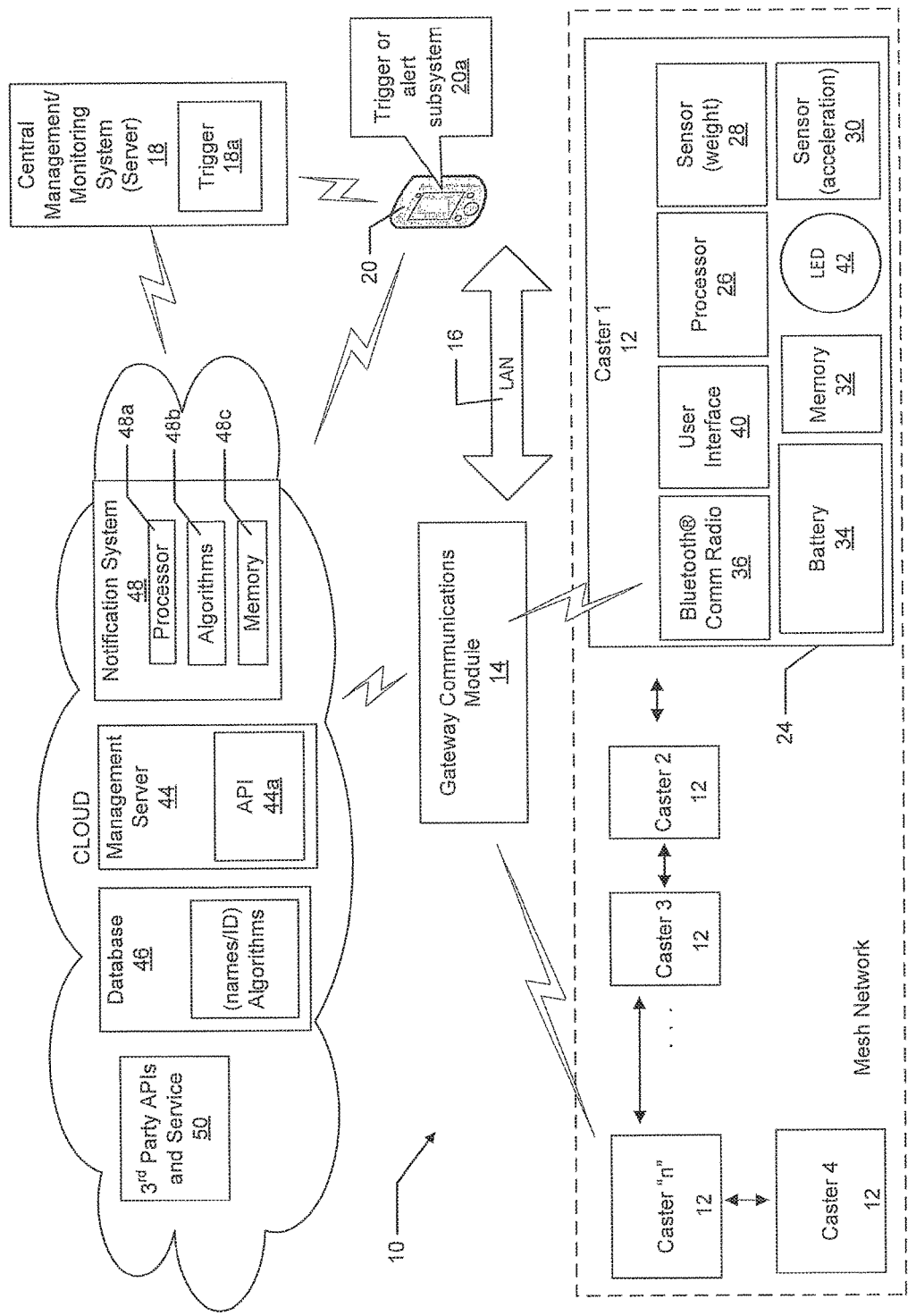
FIG. 1 is a high level block diagram of one embodiment of a system in accordance with the present disclosure for real time monitoring and management of the usage of a plurality of furniture components each having an electronic caster, and wherein each electronic caster communicates with a central gateway for the purpose of enabling real time monitoring and usage the furniture components associated with the casters.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a system 10 for monitoring and managing a plurality of furniture components. The system 10 makes use of a caster system 12 in accordance with the present teachings which may be provided with the furniture component when the furniture component is initially sold, or alternatively the caster system 12 may be constructed so as to be retrofittable to a specific furniture component model made by a specific manufacturer. Alternatively, the caster system 12 could be constructed as a "universal" caster system which is intended to replace a standardized caster used by various manufacturers. In one example the furniture component may be a chair. In another example the furniture component may be a bed. Still other examples of furniture components are tables. The caster system 12 of the present disclosure could be used with virtually any furniture component that makes use of casters for support and movement. And while most furniture components typically require the use of four or more casters, it will be appreciated that only one of the caster systems 12 needs to be implemented on a given furniture item to be able to monitor usage of the furniture item.

FIG. 1 illustrates a plurality of caster systems 12 being used in the system 10. Virtually any number of caster systems 12 may be employed. It will be appreciated that while four or more casters may be used on a given furniture component, only one caster system 12 needs to be used with the furniture component to be able to detect a change in weight and/or motion of the component, as will be described further in the following paragraphs.

Each caster system 12 may be in wireless communication with one or more other nearby caster systems 12, and one or more designated caster systems 12 may act to relay information, in real time or at set periodic time intervals, from adjacently located caster systems 12 which it is in communication with, to a gateway communications module 14. Alternatively, one or more of the caster systems 12, or all of the caster systems 12, may communicate directly with the gateway communications module 14. A LAN 16 (which may be a wireless LAN), may communicate directly with the gateway communications module 14 or alternatively with a central management/monitoring system 18.

The gateway communications module 14 or the central management/monitoring system 18 may communicate with one or more cloud-based subsystems to report information associated with the usage of the caster systems 12. The cloud-based subsystems may report back to the central management/monitoring system 18 and/or to a personal electronic device 20, such as a smartphone, tablet, laptop, desktop, etc. The caster system 12 may have a housing 24 with one or more wheels and an internal compartment which houses one or more electronic components formed on one or more small circuit boards. The electronic components may include a processor 26, a weight sensor 28, an acceleration sensor 30, a memory 32 such as a flash memory or a non-volatile memory, a battery 34, a Bluetooth® wireless short range communications protocol radio 36 (or alternatively a ZigBee® wireless communications protocol transceiver or Wi-Fi), which may be configured to operate in a mesh configuration or a non-mesh configuration, and an optional user interface 40. The processor 26 may have internal ROM (not shown) which is hard coded with an identification code that unique identifies the caster system 12 to the gateway communications module 14. If the optional user interface 40 is provided, this could be formed by a miniature panel of a plurality of switches that can be set to provide a user designated code that the processor 26 uses when its communicates with the gateway communications module 14. The housing 24 may incorporate a removable wall or cover member that allows access to the battery 34 and/or to the user interface 40. The housing 24 may also incorporate an LED 42 which functions as a status indicator that the caster system 12 is operable and is powered on. If the LED 42 is turned off, this may indicate to the user that the battery 34 needs replacing. In one preferred implementation to maximize battery life, the LED 42 is flashed on periodically for a short time duration (e.g. 0.5-1.0 seconds) to indicate that the caster system 12 is powered on (e.g., "heartbeat"). The LED 42 could also be switched in a "pairing" process when some external device is setting up a communications link with the caster system 12. The processor 26 could also implement a flashing On/Off condition for the LED 42 if the battery power drops below a predesignated value (e.g., below 10%).

If it is desired that the casters 12 are part of a mesh network, then a Bluetooth® protocol low energy mesh network may be implemented, or alternatively a SmartMesh wirelessHART mesh network, ZigBee® wireless protocol network or Thread wireless protocol network may be implemented. In either type of mesh network, each caster system 12 would essentially function as a "node" of the mesh network, and would be able to receive wireless signals from adjacent caster systems 12 within a predetermined radius. Each caster system 12 may communicate directly with the gateway communications module 14 or, if it is at too great a distance from the gateway communications module 14, its transmissions may be relayed by one or more adjacent nodes and reported to the module 14. The cloud based systems may include a management server 44 having a suitable API 44a running thereon for interpreting and managing the real time data received from all the caster systems 12. The API 44a may be used by the personal electronic device 20 to retrieve usage statistics and to receive notifications. A database 46 may be independent of, or integrated with, the management server 44. The database 46 may contain names, identification codes, algorithms for interpreting received data and/or generating real time utilization information use for an organization or entity. A notification system 48 may be independent of or integrated with the management server 44. The notification system 48 may be on a server in the cloud and may have a processor 48a, various algorithms 48b needed for analyzing the received information to generate triggers or alerts, and a suitable memory 48c (RAM or ROM). The notification system 48 may be used to generate messages and real time utilization information (e.g., reports) that is communicated either to the central management/monitoring system 18 or to the PED 20 of a given user. Optionally, third party APIs and services 50 may also be in communication with the management server 44. Such third party services may be health related entities, such as health insurance companies, that would find the data produced by the system 10 useful.

The central management/monitoring system 18 may include a "trigger" or alert subsystem 18a which identifies when the furniture components associated with a specific caster system 12 experiences an event. The trigger or alert subsystem 18a may be an API provided by a server associated with the central management/monitoring system 18. By "event", it is meant some action that would be useful for the entity operating the central management/monitoring system 18 to recognize. An "event" could be a specific chair at a desk becoming unoccupied, or being occupied. Likewise, an "event" may represent a specific bed becoming occupied or becoming unoccupied. Still further, an event could be a notification that a specific bed or chair has been occupied for more than one hour. This information could be conveyed to a user in any number of ways, such as generating a pop-up notification on a display screen or by highlighting those furniture items presented in a list of furniture components where no individual is sensed as being seated or laying on the furniture component. Optionally, a similar trigger or alert subsystem 20a, for example an API, may be used on a user's PED 20.

Figure 2:
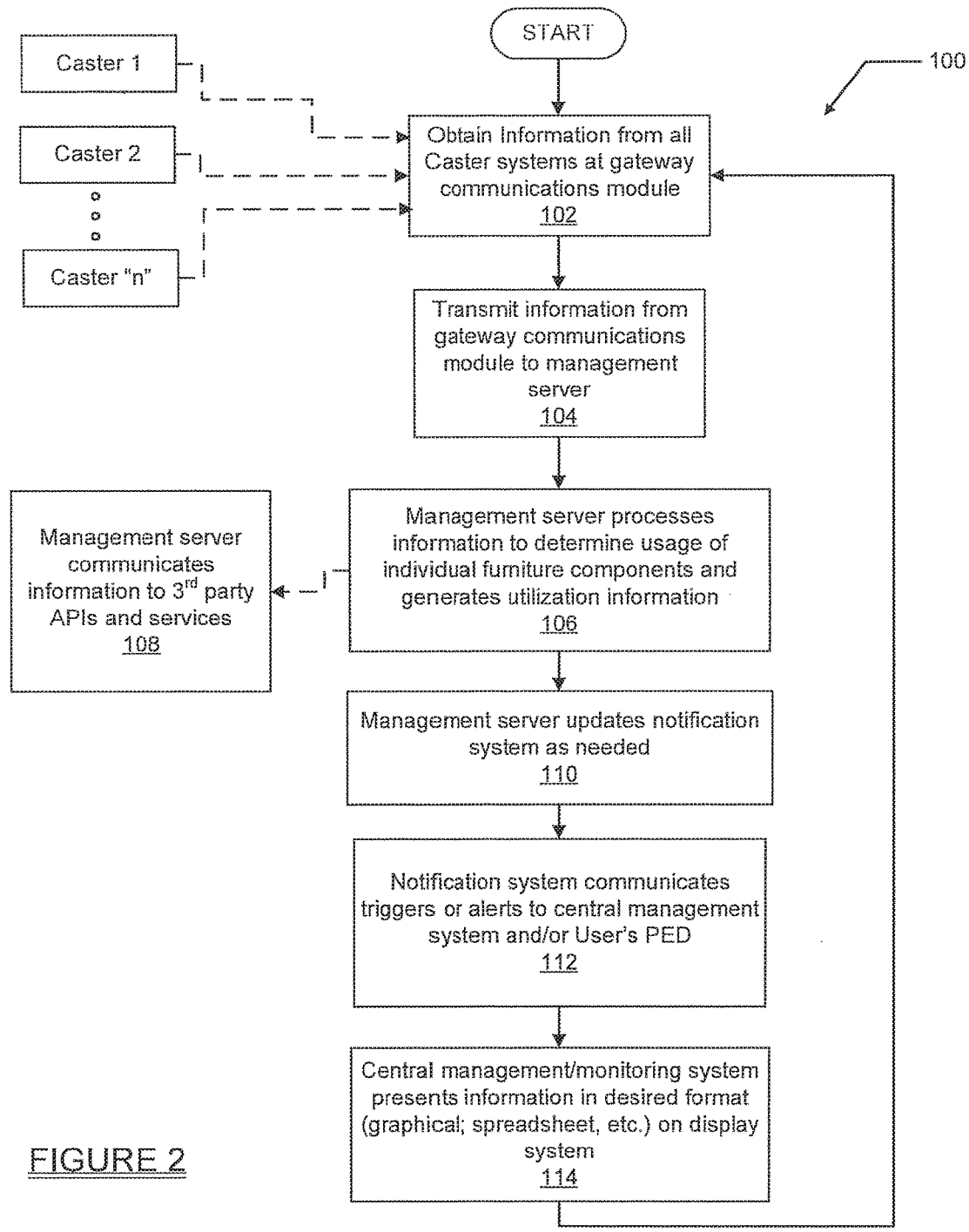
FIG. 2 is a flowchart illustrating various operations that the system of FIG. 1 may perform during its operation.

Referring to FIG. 2 a flowchart 100 is shown illustrating various operations that are performed by the system 10. At operation 102 each of the caster systems 12 reports its information to the gateway communications module 14. The information may indicate that a person is presently sitting (or lying) on a furniture component such as a chair or bed. As such, the information may represent a weight that the caster system 12 is sensing or possibly movement such as an acceleration of the caster. This information may be transmitted using the Bluetooth® protocol communications radio 36 to the gateway communications module 14 or possibly to nearby casters 12 which act as nodes to relay the information to the module 14, as indicated at operation 104.

At operation 106 the management server 44 processes the information to determine usage of individual furniture components and generates information on availability or utilization. The information may be presented in any suitable format on a display screen such as in a grid of icons, with each icon representing a single furniture component (e.g., chair or bed) and with different colors indicating which furniture components are presently occupied and which are presently unoccupied. The furniture components can be further segregated into distinct groups in the display format, for example to represent all of the chairs at work desks in a first given area of an office, and a second group representing chairs in a specific conference. Thus, the user may be provided, at a glance, with the availability of furniture components in different areas of an office building. In a health care setting, the display may be segregated into floors or even departments (e.g., pediatrics, cardiology, etc.) within a given floor, with the beds in each in each floor/department indicated by an icon that is highlighted with a first color to indicate "occupied" and a second color to indicate "unoccupied".

At operation 108, an optional operation may be performed by which the management server 44 communicates information on furniture component usage or overall utilization to a third party API or a third party service. Such a service could be a health care provider or any other type of entity that would find the information useful.

At operation 110 the management server 44 updates the notification system 48 as needed. The notification system may be used to analyze the received information and to provide triggers or alerts to the central management/monitoring system 18 when a specific condition is met. Such a trigger or alert may be generated if a furniture component becomes available for use, or if a specific furniture component has been detected as being unoccupied for a minimum time period. This another trigger or alert may be provided if a hospital bed becomes unoccupied for a given amount of time, such as more than ten minutes. In a health care setting this may be valuable to provide health care workers that a patient who has left her/his bed has not returned after a predetermined time period. This can help health care workers more quickly detect that a patient may have fallen in a bathroom area, or may otherwise be in a position where help is needed.

At operation 112 the notification system 48 communicates any triggers or alerts to the central management/monitoring system 18 and/or to the user's PED 20. The central management/monitoring system 18 may also use its own trigger or alert subsystem 18a to provide additional alerts to certain conditions having arisen. Likewise, the trigger 20a running on the user's PED 20 could be used to provide alerts or other notifications of specific conditions having arisen. Such alerts or notifications could be provided via email, text message, or any other suitable means.

At operation 114 the central management/monitoring system 18 may present the information in a desired format to a suitable display device, for example a display monitor (e.g., LED, not shown). If the PED 20 is being used to receive the information, then the information could be formatted in a suitable way to make same easily read and understood on the relatively small display associated with many PEDs.

It will be appreciated that the operations 102-114 are preferably performed in real time using real time information obtained from the caster systems 12. It will also be appreciated that implementing the caster systems 12 may involve performing a calibration operation by which each caster system 12 "learns" the unoccupied weight of the furniture component that it is used with. In this manner, when a user sits or lays down on a furniture component which has incorporated one of the caster systems 12, the caster system 12 will be able to detect the sudden change in weight and provide a signal indicating the presence or absence of an individual. In this regard the calibration essentially informs the caster system 12 what "unoccupied" weight it will sense when no user is present sitting in, or lying on, the furniture component. The calibration procedure may also involve setting a "minimum" weight that will be recognized as a person. Thus, if someone sets a back pack on a furniture component, where the backpack weighs maybe 25 pounds, the caster system 12 would not mistakenly detect that an individual has sat (or laid) down on its associated furniture component, which in this example would be a chair or a bed. The calibration may be accomplished by setting a switch on the user interface 40 to place each caster system 12 into a calibration mode for a predetermined time period, which enables the caster system 12 to sense a "normal" or "unoccupied" weight using sensor 28, of its associated furniture item, and then switching off the calibration mode after the predetermined time period has expired.

Figure 3:
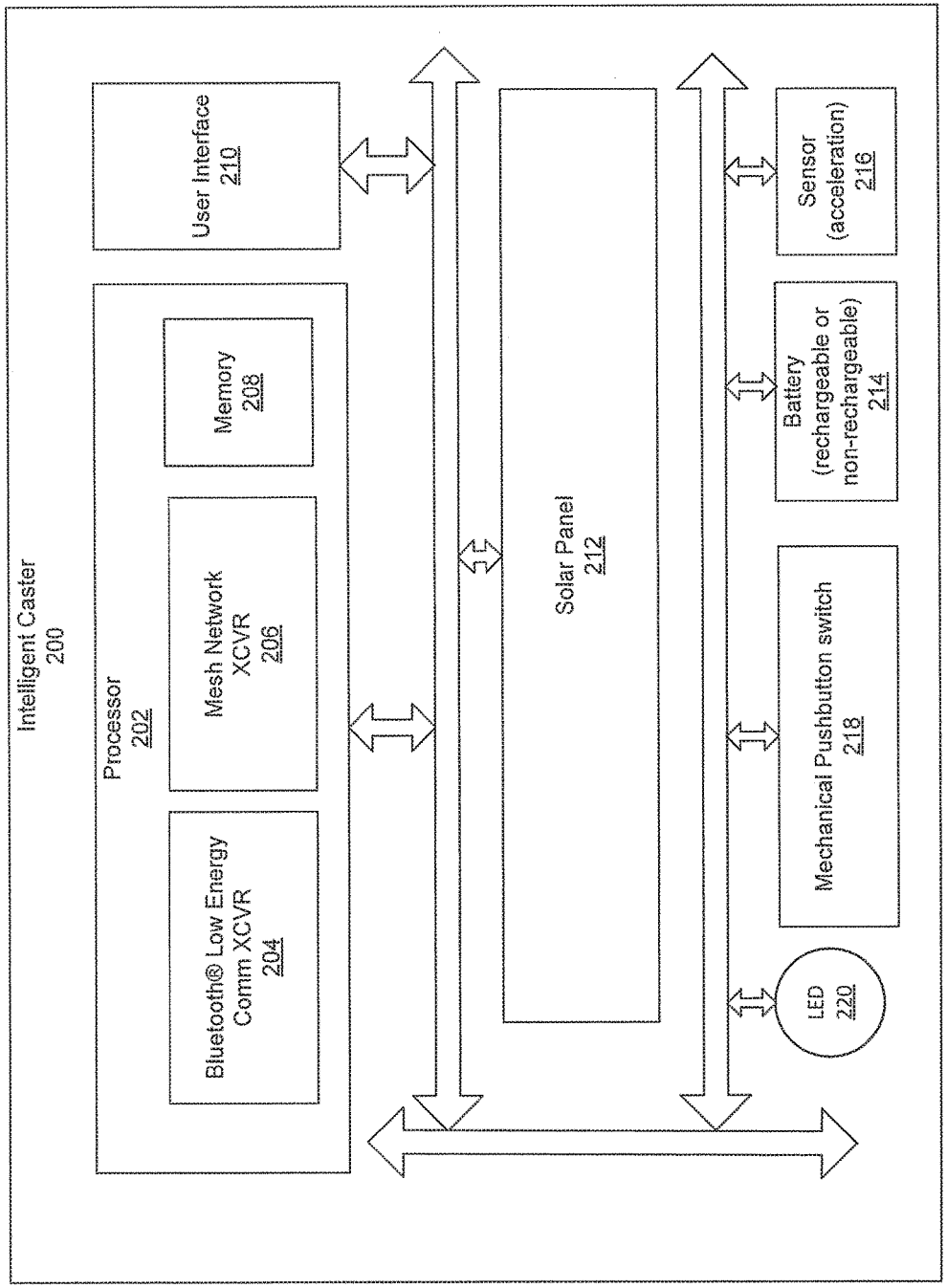
FIG. 3 is a high level block diagram of another embodiment of an intelligent caster system in accordance with the present disclosure in which the caster system includes a switch for sensing when an individual is present on the furniture component that the caster is being used with (e.g., chair or bed), and a solar panel for providing power to a rechargeable battery contained in the caster system.

Referring to FIG. 3, one example of an intelligent caster system 200 in accordance with the present disclosure is illustrated. The intelligent caster system 200 (hereinafter simply "caster system 200") in this example may include a processor 202, a Bluetooth® protocol, wireless, low energy communications transceiver 204, a mesh network transceiver such as a ZigBee® protocol wireless transceiver 206, a Wi-Fi transceiver 207, a Thread wireless protocol network transceiver 209, or any other suitable type of wireless communications transceiver/protocol. A memory such as RAM and/or ROM 208 may be included. The processor 202, the transceivers 204, 206, 207 or 209, and the memory 208, may all be formed on a single integrated circuit chip or optionally they may form separate components mounted on a circuit board. A user interface 210 may optionally be included to enable communication with the processor 202 or any of the components, such as to enable updating firmware. The user interface 210 could also be a switch that facilitates a "pairing" with an individual user, workstation, conference room, hospital room, etc., or that otherwise uniquely identifies the caster system 200. The user interface 210 could also be used to place the caster system 200 into a self-test mode for diagnostics.

The caster system 200 further includes a small, flexible, curved solar panel 212 that may be mounted on a portion of the system to generate DC power for recharging a rechargeable battery 214 contained in the system. An acceleration sensor 216 may also optionally be included to detect when the caster system 200 is being moved about. A suitable sensing element, in this example a mechanical pushbutton switch 218, may be used to detect when an individual sits or lays on a piece of furniture (e.g., chair or bed) that the caster system 200 is supporting. An optional LED 220 may be included either to indicate that the caster system 200 is operational and powered on, or for any other reason, such as assisting in performing self-tests of the caster system 200 or diagnostics.

Referring to FIGS. 4 and 5, a high level schematic representation of the caster system 200 is shown to further illustrate certain aspects of the components of the system. The caster system 200 includes a neck portion 224 which extends from a body portion 222, and which includes a stem portion 224a. The stem portion 224a may be press fit into the neck portion 224 in conventional fashion. Optionally, the stem portion 224a could even be threaded in the event the frame portion that the caster system 200 makes use of a threaded bore. The body portion 222 and the neck portion 224 may both be made from any suitably strong material, but it is anticipated that high strength plastic will be most popular for constructing the body portion and the neck portion. The body portion 222 and the neck portion 224 may also be integrally formed as a single component, such as by injection molding, or alternatively they could be formed as separate components and fastened together in a suitable manner. Again, it is anticipated that the body portion 222 and the neck portion 224 will typically be formed from a high strength material as a single component. The neck portion 224 will typically be supporting a leg or a portion of a frame of a furniture component 226, which may be a chair, a bed, a table or any other furniture component where it would be important to sense if a predetermined minimum amount of weight is being supported by the furniture component.

The body portion 222 may include a door or panel, represented by dashed lines 228, which is either permanently or removably secured to the body portion 222 to enclose the processor 202, the rechargeable battery 214, and the other electronic components. Alternatively, since most present day casters have two concentric wheels on a shaft, there could be a mechanism to remove one of the wheels to gain access to the internal electronics.

The solar panel 212 forms a flexible, curved component that is attached, such as by adhesives or in any other suitable manner to a wheel shroud element 230 resting over one or more moveable wheels 232. The solar panel 212 thus has a radius of curvature similar or identical to that of the wheel shroud element 230. A suitable opening 234 may be formed in the body portion 222 to allow electrical conductors (not shown) from solar panel 212 to project through the body portion and into an interior area thereof without affecting rolling motion of the caster wheel 232.

The mechanical pushbutton switch 218 may be mounted in the neck portion 224 underneath a flexible disc element 236, for example a Belleville washer made from spring steel or another suitable material. Alternatively, a piezoelectric sensor could be used instead of a pushbutton switch (or possibly even in connection with a pushbutton switch) in order to measure the amount of deflection. This would be helpful for calibrating the caster system 200 to account for the various weights of the unoccupied furniture item (e.g., chair, bed, table, etc.). Still further, other components for measuring the weight of the chair/bed with and without an occupant could include a load cell, a strain gauge or a force sensor operably coupled to the stem portion 224a. It is also anticipated that a linear position sensor or an inductance sensor may be incorporated to detect the amount of compression of a spring such as the flexible disc element 236, or possibly even a conventional coil spring which is used in place of the flexible disc element.

With reference to FIG. 6, the flexible disc element 236 includes an axially centered hole 238 which allows the stem portion 224a to project therethrough, and which allows flexing movement of the flexible disc element 236 between unflattened (FIG. 4) and flattened (FIG. 5) positions. When an individual sits or lays down on the furniture component 226, the flexible disc element 236 will be flattened into the position shown in FIG. 5 and will fully depress the mechanical pushbutton switch 218. As visible in FIG. 6, the mechanical pushbutton switch 218 may be located slightly off the axial center of the flexible disc element 236 so that it does not interfere with the stem portion 224a.

The thickness and material of the flexible disc element 236 is selected to fully flatten out when a predetermined weight is being supported on the furniture component 226. In this regard some experimentation will be required to "tune" the response of the flexible disc element 236 so that it is able to support the weight of the furniture component 226 without flattening, and only becomes fully flattened when some minimum predetermined weight is resting on the furniture component 226. Alternatively, a number of flexible disc elements 236 could be provided with each caster system 200 when the caster system is shipped. The different flexible disc elements would have different stiffnesses, which would allow the user to choose and install one having the appropriate stiffness for the furniture component that the caster system 200 is being used with. Most likely this option would be for caster systems 200 that are being retrofitted to some existing chair, bed, etc., in the user's facility. Thus, the stiffness selected for the flexible disc element 236 will need to take into account the unoccupied weight of the furniture component 226. If the caster system 200 is being used with office chairs, the minimum weight required may only be 50-75 pounds or so, which would virtually ensure that any adult who sits on the furniture component 226 will be sufficient to fully flatten the flexible disc element 236, and that the weight of the chair itself will be insufficient to flatten the flexible disc element 236. If the furniture component 226 is a bed frame with a box spring and mattress being supported thereon, the weight of the furniture component 226 will be considerably more than a typical chair. This will need to be taken into account in selecting the flexibility of the flexible disc element 236. The diameter and thickness of the flexible disc element 236, as well the specific material used to construct it, may all need to be considered when designing the flexible disc element to ensure that it provides the appropriate amount of resistance to flattening for a specific application.

When the flexible disc element 236 is fully depressed as shown in FIG. 5, the mechanical pushbutton switch 218 generates an electrical signal that signals the processor 202 that an individual has occupied the furniture component 226. This signal may be applied to a specific input pin on the processor 202. If the individual gets up off of the furniture component 226, this event will also be signaled to the processor 202. That is, the absence of a signal from the mechanical pushbutton switch 218 informs the processor 202 that the furniture component 226 is no longer occupied. This information may be relayed by the wireless communications transceiver 204 to a remote the gateway communications module 14 (FIG. 1). The time that the occupant is actually present in the furniture component 226 can thus be tracked in substantially real time.

The flexible, curved solar panel 212 provides the advantage that the rechargeable battery 214 can be periodically recharged using solar energy or even ambient light, and thus may substantially reduce, or entirely eliminate, the need to periodically replace the battery. Optionally, a non-rechargeable battery could be employed if one wishes to omit the solar panel 212.

The acceleration sensor 216 may be used to provide additional information as to when the furniture component 226 is moving. In certain applications, such as in connection with a chair, this may be important to verify that an individual is present in the chair. For example, if the chair is not sensed as having moved at all for some extended period of time, possibly one hour or more, then the system 10 may determine that a heavy object has been set in the chair and that an individual is not actually present in the chair.

A particular advantage of the caster system 200 is that it is retrofittable to all, or virtually all, existing chairs which make use of conventional casters. In other words, no modification will be required to the frame of the chair when the caster system 200 is attached to the frame. However, different manufacturers of chairs, as well as beds, may have slightly different constructions which require certain dimensions for the stem portion 224a. Also, the diameter of the wheels used on casters for different furniture manufacturers may differ. These are minor construction variations that may be incorporated into the caster system 200 if needed. And though a typical chair uses between 4 and 6 casters for support, only one caster system 200 needs to be used with a given furniture component to provide the occupancy detection feature described herein.

The various embodiments of the system 10 as described herein provide a means by which a large number of furniture components such as, but not limited to, chairs, beds, tables, etc., can be monitored, in real time, to determine if same are in use. The various embodiments also provide a means to collect data from a large number of electronic caster systems 12 and 200 and to use the data to provide real time utilization information to a user as to exactly which furniture components are occupied and in use at any given time. This can significantly help to manage usage of workstations and conference rooms in office facilities. In a health care environment, the real time utilization information generated by the system 10 can be used to monitor bed availability or even whether patients have left their beds, or if patients have been in their beds continuously for more than a prescribed time period. This can be extremely useful for health care workers and may provide a means by which health care workers can remotely monitor patient activity.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An electronic caster system for use with a furniture component, the system comprising:
   a caster having a housing, a wheel supported for rolling movement relative to the housing having an internal compartment, and a neck portion, the neck portion adapted to be operably coupled to the furniture component to enable swiveling movement of the housing relative to the furniture component;
   a processor supported on the caster within the internal compartment;
   a low energy wireless transceiver operably associated with the processor and supported on the caster for wirelessly transmitting information to a remote system;
   a sensing component carried on the caster for sensing a condition affecting the caster, and generating an output signal in accordance with the sensed condition to the processor; and
   a user interface supported at least partially inside the internal compartment of the housing and operably associated with the processor for providing a code to the processor to be used when the processor wirelessly communicates with the remote system.

2. The system of claim 1, wherein the sensing component comprises an accelerometer for sensing an acceleration of the caster along a support surface.

3. The system of claim 1, wherein the sensing component comprises a switch for sensing when an external weight is acting on the caster.

4. The system of claim 3, wherein the switch comprises a mechanical switch having a flexible disc element able to actuate the switch when the flexible disc element is moved from a first configuration to a second configuration.

5. The system of claim 1, further comprising a solar panel supported on the housing.

6. The system of claim 1, wherein the caster includes a battery.

7. The system of claim 1, wherein the caster includes a memory in communication with the processor.

8. The system of claim 1, wherein the caster further includes a mesh network transceiver operably associated with the processor.

9. An electronic caster system for use with a furniture component, the system comprising:
- a caster having a housing, a wheel supported for rolling movement relative to the housing, and a neck portion, the neck portion adapted to be operably coupled to the furniture component to enable swiveling movement of the housing, relative to the furniture component;
- a processor supported internally within an internal compartment of the housing of the caster;
- a low energy wireless transceiver operably associated with the processor and supported within the internal compartment for wirelessly transmitting information to a remote system;
- a sensing component carried on the caster for sensing a condition affecting the caster, and generating an electrical output signal in accordance with the sensed condition to the processor; and
- a user interface having a plurality of user settable switches, the user interface being carried on the caster and housed at least partially in the internal compartment of the housing, and being in communication with the processor for providing a code to the processor to be used when the processor wirelessly communicates with the remote system.

10. The system of claim 9, wherein the sensing component comprises a mechanical switch operably associated with the neck portion of the caster, and which generates an electrical signal to indicate when a minimum predetermined force is acting on the caster.

11. The system of claim 9, wherein the sensing component comprises an accelerometer for sensing an acceleration of the caster as the furniture component is being moved along a floor surface.

12. The system of claim 9, further comprising a solar panel carried on the caster.

13. The system of claim 12, further comprising a rechargeable battery operably associated with the solar panel.

14. The system of claim 9, further comprising an LED carried on the caster and being operably associated with the processor.

15. A method of forming an electronic caster system adapted for use with a furniture component, the method comprising:
- using a caster having a housing, a wheel supported for rolling movement relative to the housing, and a neck portion adapted to support the furniture component above a support surface, the neck portion coupled to the furniture component to enable swiveling movement of the housing relative to the furniture component;
- using a processor supported in an internal compartment of the housing of to process information;
- using a low energy wireless transceiver carried within the internal compartment of the housing of the caster to transmit information to a remote system;
- using a sensing component carried on the caster for sensing a condition affecting the caster, and generating an output signal in accordance with the sensed condition to the processor; and
- using a user interface carried at least partially within the internal compartment of the housing of the caster, and operably associated with the processor, to provide a code to the processor to be used when the processor wirelessly communicates with the remote system.

16. The method of claim 15, wherein said using a sensing component comprises using a mechanical switch that detects when a force beyond a predetermined threshold is acting on the caster, and generates an electrical signal in response thereto, the electrical signal being provided to the processor.

17. The method of claim 15, wherein said using a sensing component comprises using an accelerometer to detect an acceleration of the caster along the support surface.

* * * * *